US011965375B2

(12) United States Patent
Fitzgibbon

(10) Patent No.: US 11,965,375 B2
(45) **Date of Patent: *Apr. 23, 2024**

(54) MOVABLE BARRIER OPERATOR AND METHOD

(71) Applicant: The Chamberlain Group LLC, Oak Brook, IL (US)

(72) Inventor: James J. Fitzgibbon, Batavia, IL (US)

(73) Assignee: The Chamberlain Group, LLC, Oak Brook, IL (US)

(*) Notice: Subject to any disclaimer, the term of this patent is extended or adjusted under 35 U.S.C. 154(b) by 436 days.

This patent is subject to a terminal disclaimer.

(21) Appl. No.: 17/126,010

(22) Filed: Dec. 17, 2020

(65) Prior Publication Data

US 2021/0102421 A1 Apr. 8, 2021

Related U.S. Application Data

(63) Continuation of application No. 15/912,102, filed on Mar. 5, 2018, now Pat. No. 10,934,763.

(51) Int. Cl.
*E05F 15/668* (2015.01)
*E05F 15/41* (2015.01)
(Continued)

(52) U.S. Cl.
CPC .............. *E05F 15/73* (2015.01); *E05F 15/41* (2015.01); *E05F 15/42* (2015.01); *E05F 15/668* (2015.01);
(Continued)

(58) Field of Classification Search
None
See application file for complete search history.

(56) References Cited

U.S. PATENT DOCUMENTS 4,475,069 A * 10/1984 Tadokoro .............. E05F 15/668 318/281
5,239,776 A * 8/1993 Lhotak .................. E05F 15/668 49/205

(Continued)

FOREIGN PATENT DOCUMENTS

JP 3813091 B2 * 8/2006 .............. E05F 15/40
JP 2009180042 A * 8/2009
WO WO-2014040583 A1 * 3/2014 ............ E05F 15/665

OTHER PUBLICATIONS

Genie GCL-GH™ Heavy Duty Operator Installation Manual; 52 pages, was publicly available before Mar. 5, 2017.

(Continued)

*Primary Examiner* — Muhammad Adnan
(74) *Attorney, Agent, or Firm* — DORITY & MANNING, P.A.

(57) ABSTRACT

A movable barrier operator includes a communication interface configured to receive commands that cause the motor to move the movable barrier. The movable barrier operator further includes a processing circuit configured to cause the motor to automatically move the movable barrier from a first open position toward a closed position and then from the closed position toward a second open position different from the first open position in response to receipt of an intermediate open command by the communication interface. The processing circuit can also cause the motor of the movable barrier operator to move the movable barrier toward the first open position in response to the processing circuit determining that the movable barrier had been obstructed while moving from the first open position toward the closed position.

20 Claims, 5 Drawing Sheets

(51) Int. Cl.

| | |
|---|---|
| ***E05F 15/42*** | (2015.01) |
| ***E05F 15/73*** | (2015.01) |
| ***E05F 15/77*** | (2015.01) |

(52) U.S. Cl.

CPC ........... *E05F 15/77* (2015.01); *E05Y 2400/32* (2013.01); *E05Y 2400/54* (2013.01)

(56) References Cited

U.S. PATENT DOCUMENTS

| | | | | |
|---|---|---|---|---|
| 5,931,212 | A * | 8/1999 | Mullet | F16D 41/04 74/625 |
| 6,025,685 | A * | 2/2000 | Parsadayan | E05F 15/627 318/471 |
| 6,051,947 | A * | 4/2000 | Lhotak | E05F 15/684 318/265 |
| 6,133,703 | A * | 10/2000 | Fitzgibbon | G05B 19/406 340/556 |
| 7,207,142 | B2 * | 4/2007 | Mullet | E05F 15/77 340/686.1 |
| 7,397,342 | B2 | 7/2008 | Mullet | |
| 8,495,834 | B2 * | 7/2013 | Harlow | E05F 15/74 49/28 |
| 9,879,466 | B1 * | 1/2018 | Yu | H04W 4/023 |
| 9,978,265 | B2 | 5/2018 | McNabb | |
| 10,540,884 | B1 * | 1/2020 | Lyman | G08B 15/002 |
| 10,614,647 | B2 * | 4/2020 | Deneen | E05F 15/77 |
| 10,934,763 | B2 | 3/2021 | Fitzgibbon | |
| 11,120,655 | B1 * | 9/2021 | Huggins | G07C 9/00 |
| 2003/0030299 | A1 * | 2/2003 | Cleland | E05F 15/41 296/146.8 |
| 2003/0154656 | A1 * | 8/2003 | Fitzgibbon | G07C 9/00182 49/27 |
| 2004/0107639 | A1 * | 6/2004 | Mullet | E05F 15/668 49/25 |
| 2004/0124992 | A1 * | 7/2004 | Pulis | E05F 15/603 340/686.1 |
| 2006/0103503 | A1 | 5/2006 | Rodriquez | |
| 2008/0012515 | A1 * | 1/2008 | Murray | G07C 9/00174 318/282 |
| 2008/0126975 | A1 * | 5/2008 | Vassigh | G06F 3/0219 715/772 |
| 2008/0184622 | A1 * | 8/2008 | Mullet | E05F 15/603 49/26 |
| 2008/0224886 | A1 | 9/2008 | Rodriguez et al. | |
| 2009/0282740 | A1 * | 11/2009 | Nassimi | E05F 15/73 49/31 |
| 2011/0000140 | A1 * | 1/2011 | Mays | E05F 15/77 49/506 |
| 2015/0002262 | A1 * | 1/2015 | Geerlings | G07C 9/00309 340/5.25 |
| 2015/0275564 | A1 * | 10/2015 | Rosenthal | H04W 4/80 700/275 |
| 2016/0057273 | A1 * | 2/2016 | Bochen | H04L 67/125 455/420 |
| 2016/0104373 | A1 * | 4/2016 | Geerlings | G08C 17/02 340/5.25 |
| 2016/0217638 | A1 * | 7/2016 | Child | H04L 12/2827 |
| 2016/0300415 | A1 * | 10/2016 | Deneen | E05F 15/70 |
| 2016/0321914 | A1 * | 11/2016 | Geerlings | G08C 17/02 |
| 2016/0337502 | A1 * | 11/2016 | Buescher, Jr. | H04M 1/72415 |
| 2017/0260795 | A1 * | 9/2017 | Jergess | E05F 15/632 |
| 2018/0247475 | A1 * | 8/2018 | Archbold | E05F 15/668 |
| 2018/0347250 | A1 * | 12/2018 | Null | E05F 15/43 |
| 2019/0096150 | A1 * | 3/2019 | Kulkarni | G07C 9/00182 |
| 2019/0139400 | A1 * | 5/2019 | Ikeler | G08C 23/00 |
| 2019/0271185 | A1 | 9/2019 | Fitzgibbon | |
| 2019/0323279 | A1 * | 10/2019 | Buescher | H02H 7/0851 |
| 2019/0323280 | A1 * | 10/2019 | Ghannam | E05F 15/668 |
| 2020/0219340 | A1 * | 7/2020 | Geerlings | G07C 9/00896 |

OTHER PUBLICATIONS

Liftmaster, Auto Service Solutions website, https://www.liftmaster.com/for-businesses/commercial-door-operators/auto-service-solutions, 4 pages, publicly available Mar. 2015.

Logic 3, Owner's Manual GH Industrial Duty Commercial Door Operator; 36 pages; © 2009.

USPTO; U.S. Appl. No. 15/912,102; Notice of Allowance dated Oct. 29, 2020; (pp. 1-5).

USPTO; U.S. Appl. No. 15/912,102; Office Action dated Mar. 12, 2020; (1-6).

USPTO; U.S. Appl. No. 15/912,102; Office Action dated Aug. 25, 2020, (pp. 1-7).

Office Action from CA 3,033,495 Mailed on Jan. 12, 2024, 4 pages.

* cited by examiner

MOVABLE BARRIER OPERATOR AND METHOD

CROSS-REFERENCE TO RELATED APPLICATION

This is a continuation of U.S. patent application Ser. No. 15/912,102, filed Mar. 5, 2018, entitled MOVABLE BARRIER OPERATOR AND METHOD, which is incorporated by reference in its entirety herein.

FIELD

The following disclosure relates to movable barrier operators and, more specifically, to systems and methods for controlling movable barrier operators.

BACKGROUND

Movable barrier operators are electromechanical devices or systems often employed to move movable barriers that are too difficult or inconvenient to be moved without mechanization or power assistance. One type of moveable barrier operator is a garage door opener. Garage door openers typically have a motor used to move a garage door between open and closed positions.

A garage door opener moves the garage door between open and closed positions in response to the garage door opener receiving a command from a user, such as from a wall-mounted switch or a transmitter in a user's car. In addition to having open and closed positions, it may be desirable to have the garage door partially open in certain situations. In an example, a homeowner may want to have the garage door partially open to ventilate the garage while using the mostly-closed door to substantially obstruct a view of the garage interior such as to maintain security or privacy when the homeowner is restoring a vintage vehicle or working on a project or task involving woodworking, painting, and the like. In another example, a homeowner may want to have the garage door partially open to permit a pet to enter and exit the garage. To this end, the homeowner may want to partially open the garage door to provide enough space for the pet but not enough space for a person to fit beneath the door.

As another example, a warehouse may have a very tall rolling service door to accommodate large vehicles. For smaller vehicles, such as a forklift, it may be desirable to open the door only far enough to let the smaller vehicle through. Opening a garage door only as far as is necessary for a particular vehicle may reduce heat loss from the warehouse since the door is opened less than all the way.

Figure 1:
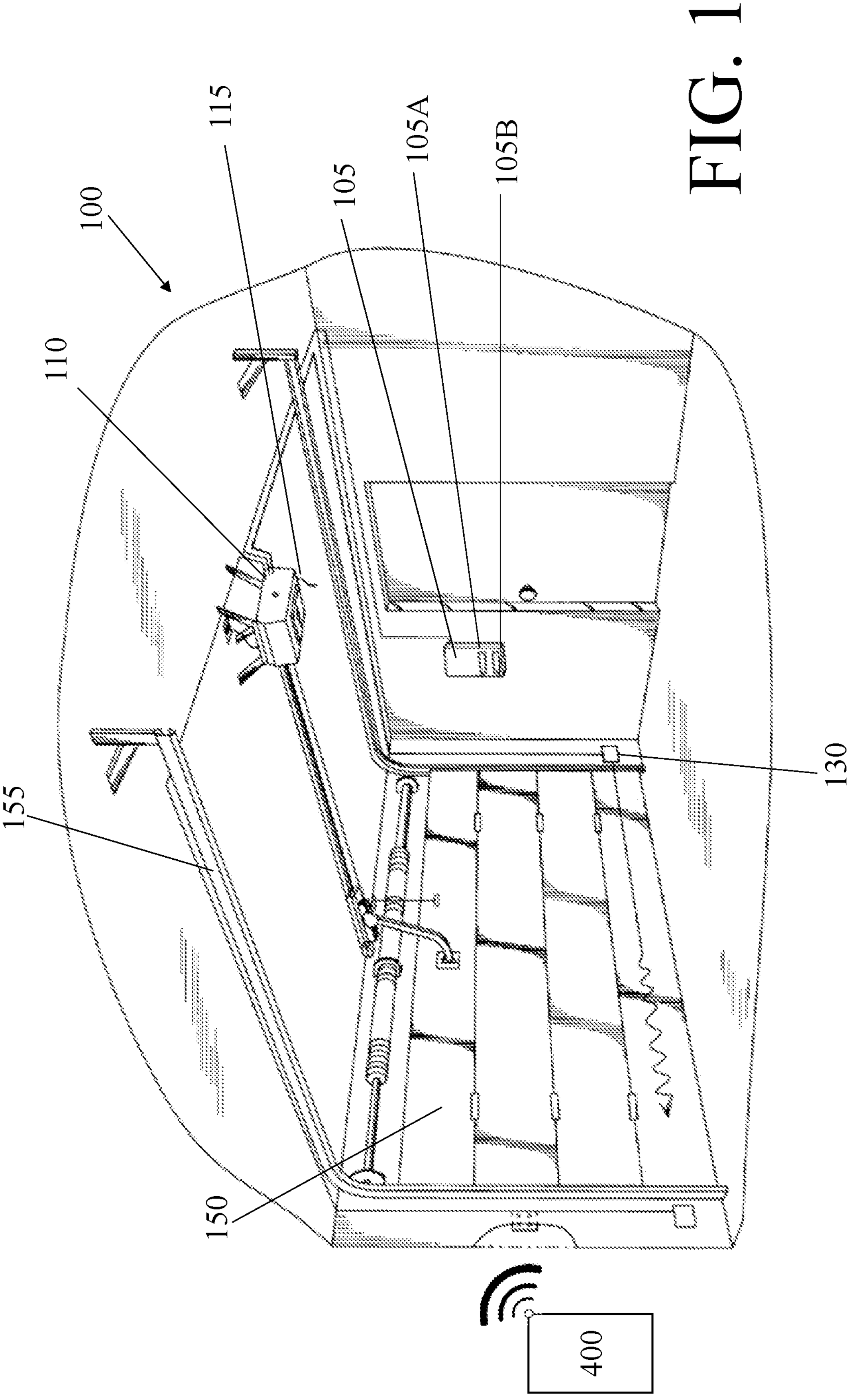
FIG. 1 is a perspective view of an example movable barrier operator configured to move a movable barrier between closed, partially open, and completely open positions.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

In accordance with one aspect of the present disclosure, a movable barrier operator is provided having a motor configured to be coupled to a movable barrier. The movable barrier operator has a communication interface configured to receive commands that cause the motor to move the movable barrier. The moveable barrier operator has a processing circuit in communication with the motor and the communication interface. The processing circuit is configured to cause the motor to automatically move the movable barrier from a first open position toward a closed position and then from the closed position toward a second open position different from the first open position in response to receipt of a single (e.g., an intermediate open) actuation or command by the communication interface. The term automatically as used herein refers to an operation performed without human intervention. The processing circuit is further configured to cause the motor of the movable barrier operator to move the movable barrier toward the first open position in response to the processing circuit determining that the movable barrier has encountered an obstruction while moving from the first open position toward the closed position. Automatically moving the movable barrier from a first open position toward a closed position, and then from the closed position toward a second open position different from the first open position, presents time and energy savings, particularly in industrial or commercial applications or settings where doors are large and take a long time to move from the completely open position to the completely closed position. In the home setting, a garage door opener that automatically moves a garage door from a first open position toward a closed position and then from the closed position toward a second open position allows users to easily let the family pet in or out through the garage door and/or provide ventilation to a pet that is crated or otherwise housed within the garage while keeping the garage substantially secure.

In accordance with another aspect of the present disclosure, savings are achieved by automatically opening the movable barrier to the second open position based on, for example, sensed parameters. When a sensed parameter causes the movable barrier operator to automatically respond by moving the movable barrier from a first open position toward a closed position and then from the closed position to a second open position different from the first open position, the user need not press any buttons at all. This is particularly important in large spaces where a user may not have a remote control and needs to exit his vehicle, such as a forklift, in order to use a wall-mounted remote control to operate a movable barrier.

In one form, the movable barrier operator stores the second open position of the movable barrier for a particular vehicle and allows the door to be precisely operated to open only to the height needed for that vehicle. This allows the facility utilizing the moveable barrier operator to reduce heat or cooling loss because the door opens only as far as needed.

With reference to FIG. 1, an example movable barrier operator system 100 is provided that includes a movable barrier operator 110 coupled to a garage door 150. The movable barrier operator 110 moves the garage door 150 along track 155 in response to commands received from a remote control 105 or a control device 400. The remote control 105 may include one or more remote controls 105 configured to send commands to the movable barrier operator 110. Examples of the remote controls 105 include a wall-mounted switch, a transmitter clipped to a visor of a vehicle, a transmitter integrated into the dashboard of a vehicle, a transmitter integrated into a rearview mirror or sun visor of a vehicle, and an infotainment system of a vehicle configured to communicate with the movable barrier operator 110.

Figure 2:
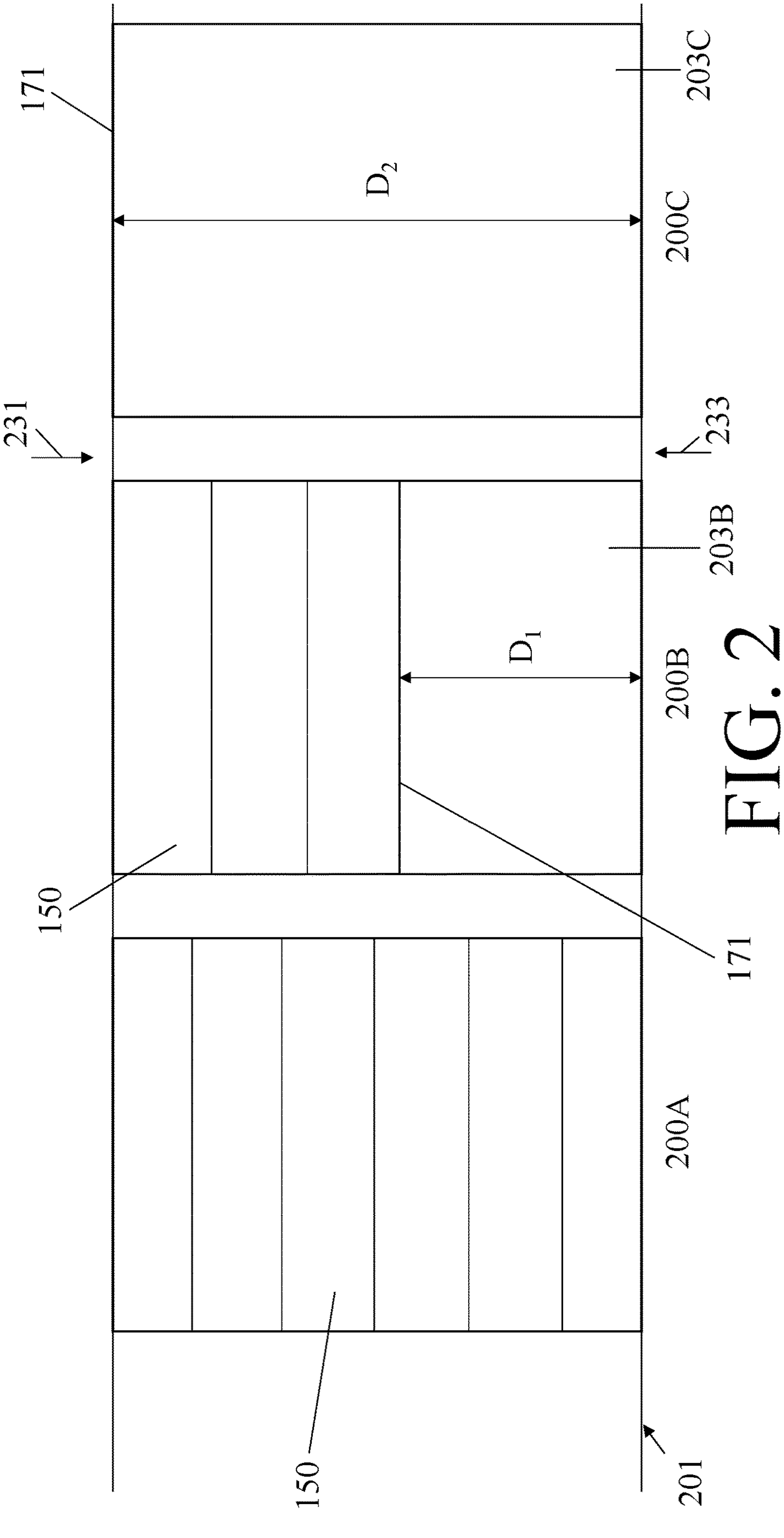
FIG. 2 is a schematic view of the garage door of FIG. 1 at the closed, partially open, and completely open positions.

The example remote control 105 as shown includes at least two buttons, an open and close button 105A and an intermediate open button 105B. The buttons 105A and 105B may be physical buttons or virtual buttons presented on a graphical user interface of a screen of the remote control 105. Although buttons 105A and 105B are illustrated and described, the buttons may alternatively be embodied or implemented by a single button which outputs different signals or commands according to different actuations of the button—e.g., a long press, short press, multiple presses, etc. The functionality of the buttons 105A and 105B may also be invoked by a voice command received at a microphone of the wall remote control 105 or control device 400. The open and close button 105A causes the movable barrier operator 110 to open and close the garage door 150 in a conventional fashion. For example, if the garage door 150 is at a closed position 200A (see FIG. 2), actuation of the open and close button 105A will cause the movable barrier operator 110 to move the garage door 150 to a completely open position 200C along track 155. The distance $D_2$ in FIG. 2 represents the distance between a bottom 171 of the garage door 150 and a garage floor 201 when the door is in the completely open position 200C. If the garage door 150 is in the completely open position 200C, actuation of the open and close button 105A will cause the movable barrier operator 110 to move the garage door 150 along track 155 to the closed position 200A where the bottom 171 of the garage door 150 is coincident with the garage floor 201 thereby sealing the garage opening. Pressing the open and close button 105A while the garage door 150 is travelling will cause the garage door 150 to stop moving along track 155. Pressing the open and close button 105A after the garage door 150 has been stopped will cause the movable barrier operator 110 to move the garage door 150 in the direction opposite the direction it was travelling before the garage door 150 stopped.

Actuation of the intermediate open button 105B will cause the remote control 150 to send an intermediate open signal to the movable barrier operator 110. Reception of the intermediate open signal causes the movable barrier operator 110 to automatically move the garage door 150 from a first open position, such as the completely open position 200C, to the fully closed position 200A and then continuously without intervention from the fully closed position 200A toward an intermediate position 200B. The distance $D_1$ in FIG. 2 represents the distance, which is different from $D_2$, between the bottom 171 of the garage door 150 and the garage floor 201 when the garage door 150 is in the intermediate position 200B. Because the moveable barrier operator 110 automatically moves the garage door 150 from the fully open position 200C, to the fully closed position 200A, and then automatically to the intermediate position 200B, multiple actuations (e.g., first press the open and close button 105A and wait for the garage door 150 to travel to the closed position 200A, and then subsequently press the intermediate open button 105B to cause the movable barrier operator 110 to move the garage door 150 from the closed position 200A to the intermediate position 200B) are obviated. Furthermore, not having to wait for the garage door 150 to completely close before pressing the intermediate open button 105B presents time savings to users of the system 100, particularly in industrial settings where doors are large and take a long time to move from the completely open position 200C to the completely closed position 200A. Pressing the intermediate open button 105B when the garage door 150 is already in the closed position causes the garage door 150 to travel directly to the intermediate position 200B.

The movable barrier operator 110 may maintain the garage door 150 in the intermediate position 200B in a number of different ways. For example, the movable barrier operator system 100 may include a spring that supports the weight of the garage door 150 once the motor 315 is turned off. The processing circuit 310 (FIG. 3) may energize the motor 315 with low-level power so that the motor 315 resists movement of the garage door 150 away from the intermediate position 200B. In another approach, the movable barrier operator 110 may have a mechanical lock that directly or indirectly limits movement of the garage door 150.

The movable barrier operator 110 may be further configured to move the garage door 150 to the intermediate position 200B in response to one or more sensed characteristics of a vehicle or a person. In one approach, the movable barrier operator system 100 includes a condition sensor 365 (see FIG. 3) constituted by one or more sensors configured to sense one or more dimensions or characteristics of a vehicle or person near the movable barrier. The movable barrier operator 110, in response to receiving an intermediate open signal from the remote control 105, opens the movable barrier to the intermediate position 200B corresponding to a signal, data or information from the condition sensor 365 representative of the sensed one or more dimensions or characteristics of the vehicle or person. The intermediate position 200B is selected so that the distance $D_1$ provides an opening 203B between the bottom 171 of the garage door 150 and the garage floor 201 that is sufficiently large to permit the vehicle or person to pass through the (partial) opening 203B. The opening 203B is smaller than the entire opening 203C when the garage door 150 is in the completely open position 200C. The smaller opening 203B provides a smaller gap through which air can flow into or out of a facility employing the movable barrier operator 110. This may limit heat transfer between the interior of the facility and the environment.

For example, the condition sensor 365 may be, one or more image sensors such as a camera 361, and may be operably coupled to the movable barrier operator 110. Image sensors may also include one or more laser-based imaging devices such as LIDAR or sound-based imaging devices such as sonar. The processing circuit 310 of the movable barrier operator 110 may automatically determine the appropriate intermediate position 200B for the garage door 150 using dimensions of the vehicle or person from acquired images of the vehicle or person. As another example, the processing circuit 310 may determine a unique identifier, such as a license plate number of the vehicle, from an image of the vehicle, look up a profile corresponding to the unique identifier, and move the movable barrier operator 110 toward the intermediate position 200B corresponding to the unique identifier. The profile corresponding to the unique identifier may be stored in a local memory, such as memory 320 of the moveable barrier operator 110, or a remote computing resource, such as a cloud-based computing system like server 350. The movable barrier operator 110 may also determine the appropriate intermediate position 200B of the garage door 150 using a facial recognition algorithm.

For example, feature points representing faces of users may be stored in the local memory 320 or the server 350. The movable barrier operator 110 may compare sensed feature point sets to stored feature point sets and determine the appropriate intermediate position 200B of the garage door 150. The feature point sets may be stored with other information about the user, and the feature point sets and the other information may be used together to determine the appropriate intermediate position 200B of the door. For example, the feature point set corresponding to a user may be stored in relation to information about that user's vehicle. In this example, the feature point set may act both to authenticate that the movable barrier operator 110 should open the garage door 150 to the intermediate position 200B and to cause the processing circuit 310 to control the movable barrier operator 110 for the appropriate intermediate position through use of, for example, the information about the user's vehicle. The feature point sets may also represent gestures, and the feature points of the gestures (e.g., thumbs up, thumbs down, sign language words, arms crossed in an x, etc.) may be used together with the feature points of the face to determine the function an authorized user would like the movable barrier operator 110 to perform. In one embodiment the authorized user may wear a tag or mark. The processing circuit 310 may process images acquired by the camera 361 and only allow gestures made by a user wearing the tag to control the movable barrier operator 110.

In one embodiment, the movable barrier operator 110 is configured to move the associated movable barrier from the closed position 200A to the intermediate position 200B in response to the processing circuit 310 determining an authorized vehicle or person is near the movable barrier. The processing circuit 310 is further configured to select the distance D1 based on the dimension(s) of the vehicle or person determined via the camera 361, such as the height of the vehicle or person.

The moveable barrier operator system 100 of FIG. 1 may further include one or more movable barrier safety sensors 360 known in the art which are configured to be active as the garage door 150 travels to or toward the closed position. For example, the moveable barrier safety sensors 360 may include an optical sensor 130 in communication with the movable barrier operator 110. The optical sensor 130 may communicate with the movable barrier operator 110 by either a wired or wireless connection. The wireless connection may be, for example, a WiFi or Bluetooth® connection. If an object moves in the path of the optical sensor 130 while the garage door 150 is travelling to the closed position 200A, the optical sensor 130 will send an obstruction signal to the movable barrier operator 110 that causes the movable barrier operator 110 to stop and/or reverse the direction of travel of the garage door 150. In some cases, small objects may be too short for the optical sensor 130 to detect. Therefore, the movable barrier safety sensors 360 may include a force sensor 363 such as a torque sensor. The force sensor 363 detects the force the motor 315 is applying to move the door, and if the force, or an indirect measure of force such as torque or current or power, is in excess of a predetermined limit, the movable barrier 110 will reverse the direction of travel. In this manner, the moveable barrier operator system 100 utilizes the force sensor 363 as a fail-safe device. In another embodiment, the safety sensors 360 include sensitive edging of the garage door 150. The sensitive edging may include a contact edge sensor, infrared photoeyes, or optical photoeyes as some examples.

The user can thereby be assured that the garage door 150 will reverse course and travel back to the completely open position 200C if, after the user presses the intermediate open button 105B, the garage door 150 encounters an object as the garage door 150 travels toward the closed position. The garage door 150 may encounter an object when the garage door 150 contacts the object or when the movable barrier operator 110 perceives the garage door 150 will contact an object. For example, the garage door 150 may encounter an object when the object interrupts the light beam of the optical sensor 130.

Figure 3:
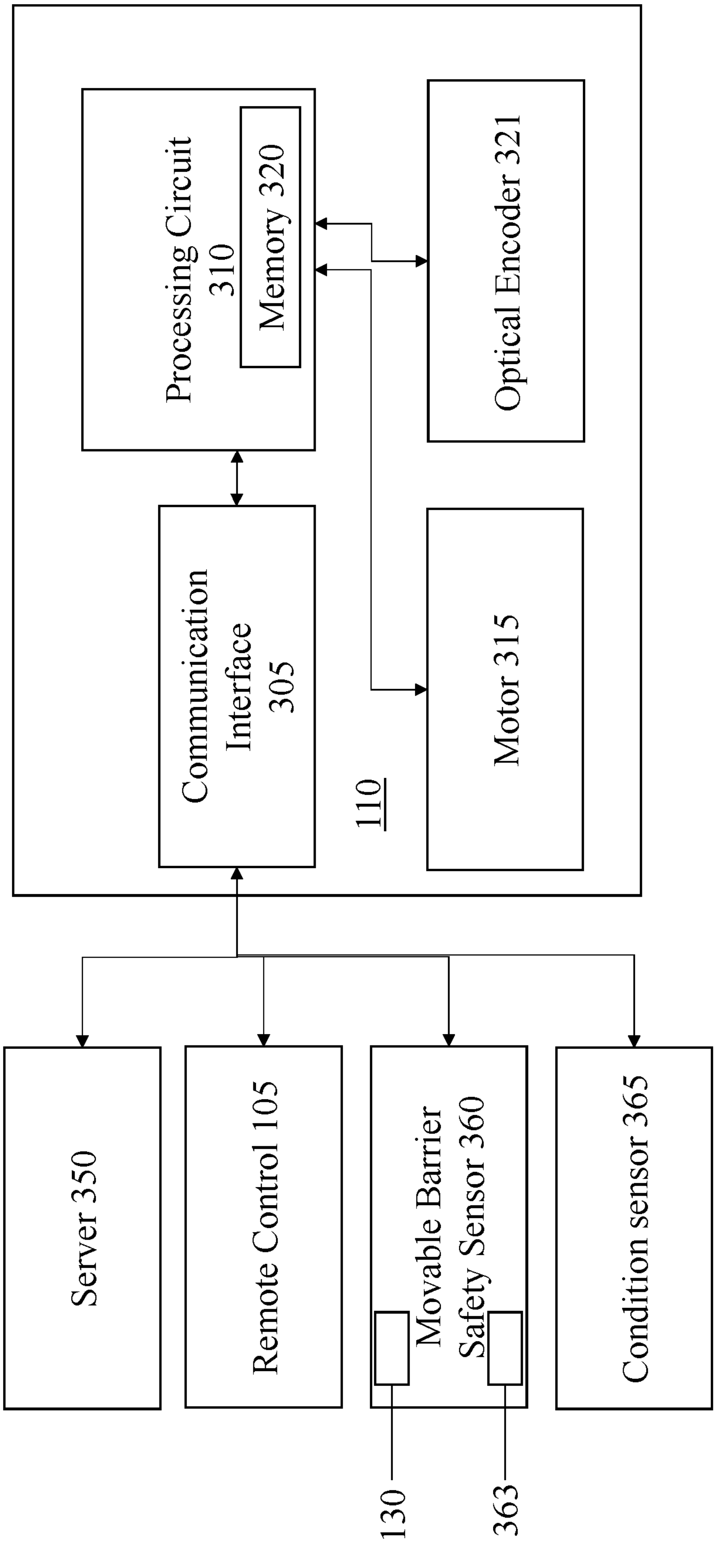
FIG. 3 is an example block diagram of the movable barrier operator of FIG. 1.

With reference to FIG. 3, the movable barrier operator 110 includes a communication interface 305 coupled to the processing circuit 310. The communication interface 305 may be configured to send and receive communications signals using one or more wired or wireless communication protocols such as Bluetooth® or WiFi. The communication interface 305 may be further configured to send and receive radio signals at one or more frequencies or modulation types. The communication interface 305 may include one or more antennas 115 (see FIG. 1) and be configured to receive commands from the remote control 105 (in a wireless embodiment) using, for example, radio signals at 315 MHz, 390 MHz, and/or 418 MHz via the one or more antennas 115. The communication interface 305 may receive commands from the remote control 105 (in a wired embodiment) by way of a serial communication or a change in voltage at an input/output board of the communication interface 305 caused by the user pressing the intermediate open button 105B and closing a circuit between the communication interface 305 and the remote control 105.

The communication interface 305 may be further configured to utilize a variety of other wired and wireless communications. For example, the communication interface 305 may be configured to receive wired or wireless communications via one or more networks or communication channels from the server 350, the movable barrier safety sensor 360, and/or the condition sensors 365 in order to operate the movable barrier operator 110. The communication interface 305 may receive one or more control signals in any of the manners described above and provide the control signals to the processing circuit 310 to cause the movable barrier operator 110 to move the garage door 150. The communication interface 305 may receive control signals over a protocol-based communications network, including a short-range network such as Wi-Fi and/or a long-range network such as a cellular network. Any functionality described as being performed by the processing circuit 310 may also be performed on the server 350 and communicated to the movable barrier operator 110 to affect moving of the garage door 150.

The processing circuit 310 includes a memory 320 and is coupled to the motor 315. The processing circuit 310 may be configured to implement the intermediate opening functionality in a number of ways. In a first embodiment, after the processing circuit 310 receives a single intermediate open command from the communication interface 305, the processing circuit 310 will control or otherwise cause the motor 315 to move the garage door 150 along track 155 to the closed position. The processing circuit 310 may then wait for a signal or other input that indicates that the garage door 150 has reached the fully closed position. The signal indicating that the garage door 150 has reached the fully closed position may be generated by a sensor of the condition sensor 365, such as a movable barrier position sensor. The movable barrier position sensor may be, for example, a track switch that remains open unless the garage door 150 is in a fully closed position. Upon the garage door 150 reaching the closed position, the track switch may close which causes a signal to be sent to the processing circuit 310, or a value, such as a voltage value, to change such that the signal or the value change causes the processing circuit 310 to cause the motor 315 to move the garage door 150 to the intermediate position 200B. The processing circuit 310 may perform other processing tasks while the garage door 150 is travelling to the closed position. Upon receipt of a signal from the track switch indicating that the garage door 150 has reached the closed position, the current processing task of the processing circuit 310 may be interrupted and the processing circuit 310 may cause the motor 315 to move the garage door 150 along track 155 to the intermediate position 200B before returning to the processing task that was interrupted. In the case where the garage door 150 is already in the closed position when the intermediate open button 105B is pressed, the processing circuit 310 may immediately be interrupted and cause the motor 315 to move the garage door 150 to an intermediate position. The processing circuit may also use multithreading to perform multiple processing tasks. The process circuit 310 may also include two or more processors to facilitate parallel processing of tasks.

The memory 320 is configured to store one or more intermediate positions 200B for the garage door 150. For example, a user may set the intermediate position 200B between the fully open position 200C and fully closed position 200A for the intermediate position 200B. The user may set, program or otherwise establish the intermediate position 200B by using the open and close button 105A to cause the garage door 150 to stop in an intermediate position, and then after the door is in the intermediate position 200B, the user may hold the intermediate open button 105B down for a predetermined number of seconds, causing the remote control 105 to send a set command to the communication interface 305 which causes the intermediate position 200B to be learned, stored in memory 320, and associated with the intermediate open button 105B. For example, the user may hold down the intermediate open button 105B for 3, 5, or 10 seconds to cause the intermediate position 200B to be stored in memory 320 and associated with the intermediate open button 105B.

To permit the processing circuit 310 to determine the position of the movable barrier 150 along the track 155, the condition sensor 365 may include two or more track switches disposed along the length of the track 155. The processing circuit 310 can determine the position of the movable barrier 150 by detecting which track switch(es) is/are closed. These track switches may operate and communicate with the movable barrier operator 110 in a similar manner to the track switch for indicating that the movable barrier operator is in the closed position described above.

In a second embodiment, in response to receiving a single intermediate open command, the processing circuit 310 may determine the position of the garage door 150 and then cause the motor 315 to move the garage door 150 to the intermediate position 200B based on the determined position. For example, an encoder, such as optical encoder 321, may encode the position of a rotatable drive member connecting the motor 315 to the belt, chain, or screw coupling the motor 315 to the garage door 150. The processing circuit 310 may count the number of interruptions of an optical beam of the optical encoder 321 to determine the position of the garage door 150. The encoder may also be any other absolute or incremental rotary encoder.

In response to receiving an intermediate open command, the processing circuit 310 may compare the current position of the garage door 150 (e.g., as determined by the optical encoder 321) to stored information representing the position of the garage door 150 in the closed position 200A. If the current position is not determined to be the closed position 200A, the movable barrier operator 110 will cause the garage door 150 to travel in direction 231 (see FIG. 2) toward the closed position 200A along track 155 until the current position is equal to the stored information representing the position of the garage door 150 in the closed position 200A. Then, after determining that the current position is equal to the stored information representing the position of the door in the closed position 200A, the movable barrier operator 110 will cause the garage door 150 to travel along track 155 in direction 233 toward the intermediate position 200B until the current position is equal to stored information representing the position of the garage door 150 in the intermediate position 200B. If, in response to receiving the intermediate open command, the processing circuit 310 determines that the current position (e.g., as determined by the optical encoder 321) of the garage door 150 is already equal to the stored information representing the position of the garage door 150 in the closed position, the movable barrier operator 110 will cause the garage door 150 to travel along track 155 in direction 233 until the current position is equal to the stored information representing the position of the garage door 150 in the intermediate position 200B.

Figure 4:
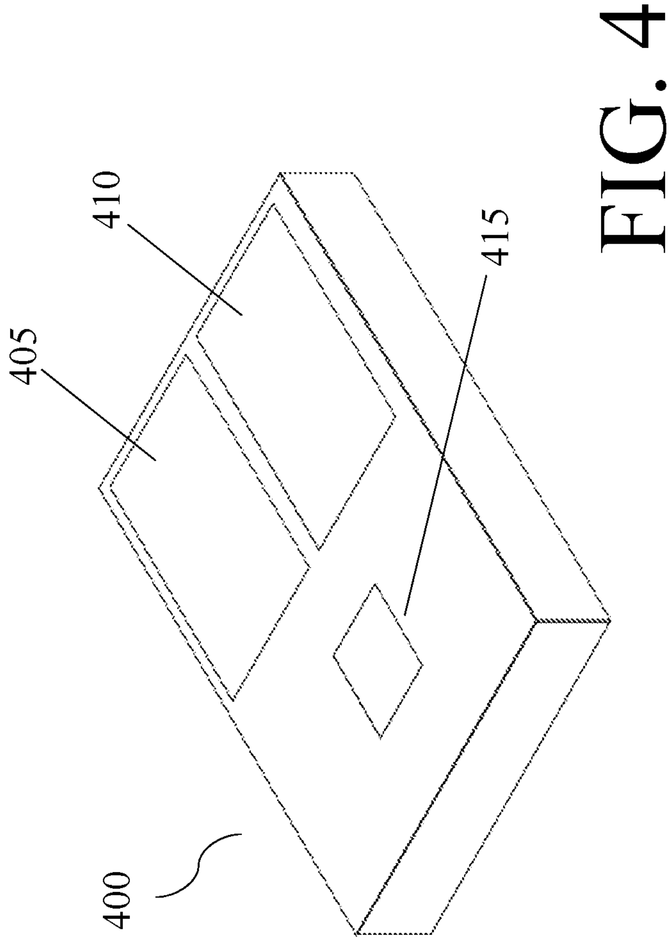
FIG. 4 is a perspective view of an example control device for operating the movable barrier operator of FIG. 1.

With reference to FIG. 4, the moveable barrier operator system 100 may include the control device 400 for controlling the movable barrier operator 110. The control device 400 may be, for example, a computing device such as a personal computer or a mobile computing device such as a smartphone, tablet computer, laptop, or smartwatch. The control device 400 is configured to communicate directly or indirectly with the movable barrier operator 110 using one or more communication channels and/or protocols. Like the remote control 105, the control device 400 has at least an open and close button 405 and an intermediate open button 410. The open and close button 405 and the intermediate open button 410 may be physical buttons or virtual buttons presented on a graphical user interface. The buttons 405 and 410 may alternatively be embodied or implemented by a single button which outputs different signals or commands according to different actuations of the button—e.g., a long press, short press, multiple presses, etc. The open and close button 405 and the intermediate open button 410 perform identical functions to the open and close button 105A and the intermediate open button 105B described above. These functions may be caused to be performed by the user's manipulation of the open and close button 405 or the intermediate open button 410. The functions may also be caused to be performed by a voice activated command received by a microphone of the control device 400, or, for example, hand gestures performed on a touch-sensitive display of control device 400 or detected by the camera 361. The control device 400 may further include a status indicator 415. The status indicator 415 may indicate to the user of the control device 400 the status of the garage door 150. For example, the status indicator 415 may indicate to the user that the garage door 150 is fully open, fully closed, in an intermediate position, or moving (e.g., specifically fully opening, fully closing, or partially opening). The status 415 may display a graphical representation of the garage door. If the door is moving, the status indicator may, for example, blink or vibrate the wireless device 400 to indicate that the door is moving. The status may also be displayed or populated on a display of the wireless device 400.

Figure 5:
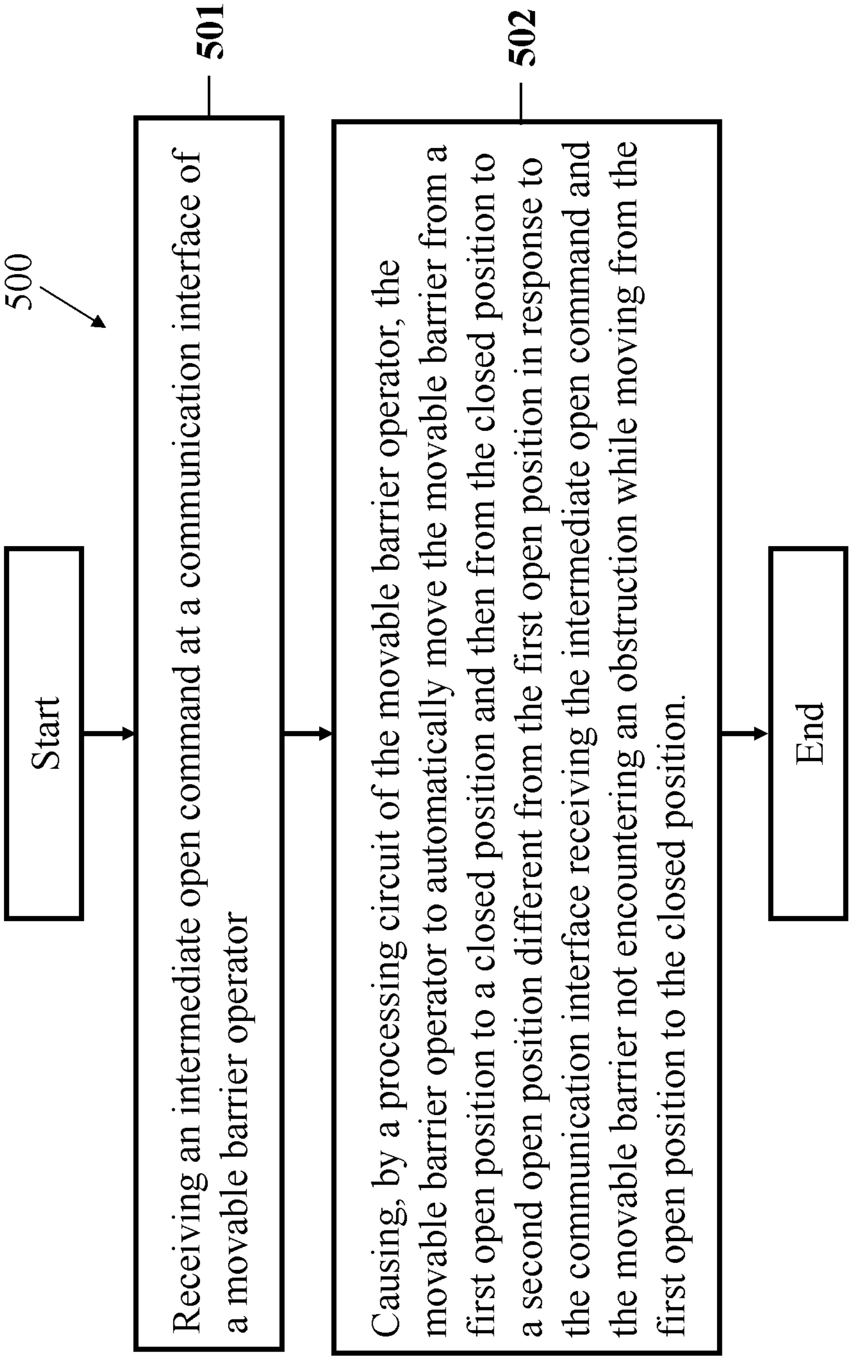
FIG. 5 is a flow diagram of an example method for controlling the movable barrier operator of FIG. 1.

FIG. 5 is a flow diagram of a method of controlling the movable barrier operator 110. The method 500 includes receiving 501 an intermediate open command at a communication interface, such as communication interface 305, of a movable barrier operator such as a movable barrier operator 110. The communication interface 305 communicates the intermediate open command to a processing circuit, such as processing circuit 310, of the movable barrier operator 110. The method 500 further includes causing 502, by the processing circuit 310 of the moveable barrier operator 110, the movable barrier operator 110 to automatically move a moveable barrier, such as a garage door 150, from a first open position, such as the completely open position 200C, toward a fully closed position, such as the closed position 200A, and then toward a second open position, such as the intermediate position 200B, that is different from the first open position 200C in response to receiving the single intermediate open command and the garage door 150 not encountering an obstruction while moving from the first open position to the fully closed position.

Although method steps may be presented and described herein in a sequential fashion, one or more of the steps shown and described may be omitted, repeated, performed concurrently, and/or performed in a different order than the order shown in the figures and/or described herein. Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

What is claimed is:

1. A non-transitory computer readable medium having instructions which, when executed by a processing circuit, cause the processing circuit to perform operations including:

in response to a communication interface coupled to the processing circuit receiving a single intermediate open command, causing a movable barrier operator to automatically move a movable barrier from a first open position to a fully closed position in a first direction and then from the fully closed position to a second open position different from the first open position in a second direction opposite the first direction and the movable barrier not encountering an obstruction while moving from the first open position to the fully closed position.

2. The non-transitory computer readable medium of claim 1, the operations further comprising determining whether the movable barrier is in the first open position and, in response to the processing circuit determining the movable barrier is in the first open position and the communication interface receiving the single intermediate open command, causing the movable barrier operator to move the movable barrier from the first open position, to the fully closed position, and then to the second open position.

3. The non-transitory computer readable medium of claim 1, the operations further comprising determining whether the movable barrier is in the fully closed position and, in response to the processing circuit determining the movable barrier is in the fully closed position and the communication interface receiving the single intermediate open command, causing the movable barrier operator to move the movable barrier from the fully closed position to the second open position.

4. The non-transitory computer readable medium of claim 1, the operations further comprising determining the second open position based on the single intermediate open command.

5. The non-transitory computer readable medium of claim 1, the operations further comprising determining that the movable barrier has encountered an obstruction based on a signal received from a sensor.

6. The non-transitory computer readable medium of claim 1, wherein the first open position of the movable barrier is a fully open position and the second open position of the movable barrier is between the first open position and the fully closed position.

7. The non-transitory computer readable medium of claim 1, wherein the first open position of the movable barrier is intermediate the second open position and the fully closed position.

8. The non-transitory computer readable medium of claim 1, the operations further comprising receiving, at the communication interface, a set command that causes the processing circuit to change a second open position setting stored in a memory, the second open position setting being associated with the second open position of the movable barrier.

9. The non-transitory computer readable medium of claim 1, the operations further comprising receiving, at the communication interface, a signal comprising at least one sensed characteristic of a vehicle and determining the second open position based on the signal.

10. The non-transitory computer readable medium of claim 1, the operations further comprising sending, by the communication interface, information regarding the position of the movable barrier to an external device configured to control the movable barrier operator.

11. The non-transitory computer readable medium of claim 1, the operations further including receiving image data of an object in proximity to the movable barrier from a camera; and determining the second open position of the movable barrier based at least in part on the image data.

12. The non-transitory computer readable medium of claim 11, wherein determining the second open position of the movable barrier based at least in part on the image data includes using a facial recognition algorithm.

13. The non-transitory computer readable medium of claim 11, further comprising detecting feature points from the image data; and wherein determining the second open position of the movable barrier based at least in part on the image data includes comparing the detected feature points to stored feature point set.

14. The non-transitory computer readable medium of claim 1, the operations further including receiving data pertaining to an object in proximity to the movable barrier from one or more sensors; and causing the movable barrier operator to move the movable barrier to the second open position in response to receiving the data pertaining to the object in proximity to the movable barrier.

15. The non-transitory computer readable medium of claim 1, the operations further comprising:

receiving data from a sensor, the data read from a tag of an object in proximity to the movable barrier; and determining the second open position of the movable barrier based at least in part on the data read from the tag.

16. A control device for controlling a movable barrier operator, the control device comprising:

a communication interface configured to send a single command configured to cause the movable barrier operator to move a movable barrier from a first open position toward a fully closed position in a first direction and then from the fully closed position to a second open position different than the first open position in a second direction opposite the first direction and the movable barrier not encountering an obstruction as the movable barrier moves from the first open position to the fully closed position;

the communication interface further configured to receive a status of the movable barrier from the movable barrier operator;

a processor configured to determine based at least on the status that the movable barrier is not in the second open position, and to indicate, in a first manner, that the movable barrier is not in the second open position, the processor further configured to determine based at least on the status that the movable barrier is in the second open position, and to indicate, in a second manner different from the first manner, that the movable barrier is in the second open position.

17. The control device of claim 16 further comprising a display, the processor configured to indicate via the display that the movable barrier is not in the second open position in the first manner and to indicate via the display that the movable barrier is in the second open position in the second manner.

18. The control device of claim 17 wherein the processor is configured to indicate the position of the movable barrier by displaying a graphical representation of the movable barrier via the display.

19. The control device of claim 16 further comprising a user interface for receiving a second open position input, the processor configured to cause the communication interface to send the single command upon receiving the second open position input.

20. The control device of claim 19 wherein the user interface includes a touchscreen display, the processor configured to present a graphical user interface via the touchscreen display for receiving the second open position input.

* * * * *